United States Patent
Coelho et al.

(10) Patent No.: US 11,956,447 B2
(45) Date of Patent: Apr. 9, 2024

(54) USING RATE DISTORTION COST AS A LOSS FUNCTION FOR DEEP LEARNING

(71) Applicant: Google LLC, Mountain View, CA (US)

(72) Inventors: Claudionor Coelho, Redwood City, CA (US); Aki Kuusela, Palo Alto, CA (US); Joseph Young, Mountain View, CA (US); Shan Li, Fremont, CA (US); Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 275 days.

(21) Appl. No.: 17/601,639

(22) PCT Filed: Mar. 21, 2019

(86) PCT No.: PCT/US2019/023339
§ 371 (c)(1),
(2) Date: Oct. 5, 2021

(87) PCT Pub. No.: WO2020/190297
PCT Pub. Date: Sep. 24, 2020

(65) Prior Publication Data
US 2022/0201316 A1     Jun. 23, 2022

(51) Int. Cl.
*H04N 19/147* (2014.01)
*G06T 9/00* (2006.01)
(Continued)

(52) U.S. Cl.
CPC .......... *H04N 19/147* (2014.11); *G06T 9/002* (2013.01); *H04N 19/176* (2014.11); *H04N 19/96* (2014.11)

(58) Field of Classification Search
None
See application file for complete search history.

(56) References Cited

U.S. PATENT DOCUMENTS

| 2018/0176577 A1* | 6/2018 | Puri | H04N 19/196 |
| 2019/0045195 A1* | 2/2019 | Gokhale | H04N 19/14 |

(Continued)

OTHER PUBLICATIONS

International Search Report and Written Opinion of International Application No. PCT/US2019/023339 dated Dec. 13, 2019, 23 pgs.
(Continued)

*Primary Examiner* — Xiaolan Xu
(74) *Attorney, Agent, or Firm* — Young Basile Hanlon & MacFarlane, P.C.

(57) ABSTRACT

An apparatus for encoding an image block includes a processor that presents, to a machine-learning model, the image block, obtains the partition decision for encoding the image block from the model, and encodes the image block using the partition decision. The model is trained to output a partition decision for encoding the image block by using training data for a plurality of training blocks as input, the training data including for a training block, partition decisions for encoding the training block, and, for each partition decision, a rate-distortion value resulting from encoding the training block using the partition decision. The model is trained using a loss function combining a partition loss function based upon a relationship between the partition decisions and respective predicted partitions, and a rate-distortion cost loss function based upon a relationship between the rate-distortion values and respective predicted rate-distortion values.

20 Claims, 10 Drawing Sheets

(51) Int. Cl.
    *H04N 19/176*    (2014.01)
    *H04N 19/96*    (2014.01)

(56) References Cited

U.S. PATENT DOCUMENTS

| | | | |
|---|---|---|---|
| 2019/0147105 A1* | 5/2019 | Chu | G06N 3/044 |
| | | | 386/241 |
| 2020/0162729 A1* | 5/2020 | Lee | H04N 19/18 |
| 2020/0344474 A1* | 10/2020 | Leleannec | H04N 19/105 |

OTHER PUBLICATIONS

MAli Xu et al; "Reducing Complexity of HEVC: A Deep Learning Approach"; Cornell University Library, Sep. 19, 2017, 17 pgs.

Chen Ke et al.; "CNN Oriented Fast CU Partition Decision and P_U Mode Decision for HEVC Intra Encoding"; 2018 14th IEEE International Conference on Solid-State and Integrated Circuit Technology, IEEE, Oct. 31, 2018, pp. 1-3.

\* cited by examiner

USING RATE DISTORTION COST AS A LOSS FUNCTION FOR DEEP LEARNING

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

One aspect of the disclosed implementations is a method for encoding an image block using a first encoder. The method includes presenting, to a machine-learning model of the first encoder, the image block, wherein the machine-learning model is trained to output a partition decision for encoding the image block by using training data for the plurality of training blocks as inputs to the training of a machine-learning module that includes the machine-learning model, the training data including, for a training block of a plurality of training blocks, a plurality of partition decisions used by a second encoder for encoding the training block, and, for each partition decision of the plurality of partition decisions, a rate-distortion value resulting from encoding the training block using the partition decision. The machine-learning model is trained using a loss function combining a partition loss function that is based upon a relationship between the partition decisions and respective predicted partitions, and a rate-distortion cost loss function that is based upon a relationship between the rate-distortion values and respective predicted rate-distortion values. The method also includes obtaining the partition decision for encoding the image block from the machine-learning model, and encoding, in a compressed bitstream, the image block using the partition decision.

Another method described herein includes presenting, to a machine-learning model of a first encoder, an image block, wherein the machine-learning model was trained to output a partition decision for encoding the image block with training data for a plurality of training blocks, the training data including, for a training block of the plurality of training blocks, a plurality of partition decisions used by a second encoder for encoding the training block, and, for each partition decision of the plurality of partition decisions, a rate-distortion value resulting from encoding the training block using the partition decision, and with a loss function comprising a combination of a partition loss function that is based upon a relationship between the partition decisions and respective predicted partitions, and a rate-distortion cost loss function that is based upon a relationship between the rate-distortion values and respective predicted rate-distortion values. The method also includes obtaining the partition decision for encoding the image block from the machine-learning model, and encoding, in a compressed bitstream, the image block using the partition decision.

An apparatus according to the teachings herein includes a processor that is configured to receive training data comprising a plurality of training blocks and, for a training block of the plurality of training blocks, a plurality of partition decisions used by an encoder for encoding the training block, and, for each partition decision of the plurality of partition decisions, a rate-distortion value resulting from encoding the training block using the partition decision. The processor is configured to train a machine learning model to output a partition decision for encoding an image block by inputting the training data into a neural network using a loss function comprising a combination of a partition loss function that is based upon a relationship between the partition decisions and respective predicted partitions, and a rate-distortion cost loss function that is based upon a relationship between the rate-distortion values and respective predicted rate-distortion values.

Another aspect is an apparatus for encoding an image block. The apparatus includes a processor that presents, to a machine-learning model, the image block, obtains the partition decision for encoding the image block from the machine-learning model, and encodes, in a compressed bitstream, the image block using the partition decision. The machine-learning model is trained to output a partition decision for encoding the image block by using training data for a plurality of training blocks as inputs to the training of the machine-learning model, the training data including, for a training block of the plurality of training blocks, a plurality of partition decisions used by an encoder for encoding the training block, and for each partition decision of the plurality of partition decisions, a rate-distortion value resulting from encoding the training block using the partition decision, wherein the machine-learning model is trained using a loss function combining a partition loss function that is based upon a relationship between the partition decisions and respective predicted partitions, and a rate-distortion cost loss function that is based upon a relationship between the rate-distortion values and respective predicted rate-distortion values.

Another apparatus described herein includes a processor that presents, to a machine-learning model, the image block. The machine-learning model was trained to output a partition decision for encoding the image block with training data for a plurality of training blocks, the training data including, for a training block of the plurality of training blocks, a plurality of partition decisions used by an encoder for encoding the training block, and, for each partition decision of the plurality of partition decisions, a rate-distortion value resulting from encoding the training block using the partition decision. The machine-learning model was also trained with a combination of a partition loss function that is based upon a relationship between the partition decisions and respective predicted partitions, and a rate-distortion cost loss function that is based upon a relationship between the rate-distortion values and respective predicted rate-distortion values. The processor also obtains the partition decision for encoding the image block from the machine-learning model and encodes, in a compressed bitstream, the image block using the partition decision.

Another aspect is an apparatus for encoding an image block that includes a machine-learning model, an encoder, and a processor. The encoder generates training data by encoding each training block of a plurality of training blocks multiple times, each time encoding a respective training block using a respective partition decision of a plurality of partition decisions. The processor trains the machine-learning model to output a partition decision for encoding the image block by using the training data as inputs to the training of the machine-learning model, the training data including, for a training block of the plurality of training blocks, the partition decisions used by the encoder for encoding the training block, and, for each partition decision of the partition decisions, a rate-distortion value resulting from encoding the training block using the partition decision. The machine-learning model is trained using a loss function combining a partition loss function that is based upon a relationship between the partition decisions and respective predicted partitions, and a rate-distortion cost loss function that is based upon a relationship between the rate-distortion values and respective predicted rate-distortion values.

Each aspect may optionally include one or more of the following features. The loss function may include uneven weighting of the partition loss function and the rate-distortion cost loss function. The partition loss function may comprise a binary cross entropy loss function. The binary cross entropy loss function may apply respective weights to the partition decisions, a weight applied to a partition decision of the plurality of partition decisions equal to the rate-distortion value of the partition decision normalized by a lowest rate-distortion value resulting from the plurality of partition decisions. The rate-distortion cost loss function may exponentially penalize a predicted partition that does not match a selected partition decision for the training block that results from an exhaustive partition search of the second encoder. The machine-learning module may comprise a rate-distortion cost estimator that receives a predicted partition from the machine-learning model and estimates a predicted rate-distortion value for the loss function, and the machine-learning model is a convolutional neural network model. For each partition decision of the plurality of partition decisions, the rate-distortion value resulting from encoding the training block using the partition decision may comprise a rate-distortion cost for encoding the training block without further partitioning the training block and a cost incurred when splitting the training block. The plurality of partition decisions may comprise quad-tree partition decisions. The plurality of partition decisions may comprise partition decisions resulting in at least one non-square partition of the training block. The second encoder may comprise a block-based encoder. The rate-distortion cost loss function may be, for each partition decision of the plurality of partition decisions, an exponential function comprising a difference between the rate-distortion value resulting from encoding the training block using the partition decision and a predicted rate-distortion value. For each partition decision of the plurality of partition decisions, a respective predicted rate-distortion value may be normalized using a lowest rate-distortion value of the plurality of partition decisions within the rate-distortion cost loss function. The rate-distortion cost loss function may comprise: a determination of the predicted rate-distortion value using the partition decision of the plurality of partition decisions and the rate-distortion value resulting from encoding the training block using the partition decision of the plurality of partition decisions, wherein the partition decision comprises a combination of splitting and non-splitting decisions of the training block, and the rate-distortion value comprises a combination of rate-distortion values resulting from encoding the training block using the combination of splitting and non-splitting decisions. A predicted rate-distortion value may comprise a first term representing a rate-distortion cost of a non-splitting decision for the training block and a second term representing a rate-distortion cost of a splitting decision for the training block that splits the training block into a plurality of sub-blocks. The rate-distortion cost of the splitting decision for the training block that splits the training block into the plurality of sub-blocks may comprise a respective rate-distortion cost for partition decisions of each of the plurality of sub-blocks; the rate-distortion cost of the first term may be weighted by a lowest rate-distortion value of the plurality of partition decisions used for encoding the training block; and the rate-distortion cost of the second term may comprise weighting each of the respective rate-distortion costs for partitioning each of the plurality of sub-blocks by the lowest rate-distortion value of the plurality of partition decisions used for encoding the training block. The machine-learning model may be trained using a machine-learning module comprising the machine-learning model and a rate-distortion cost estimator, the rate-distortion cost estimator receiving a predicted partition from the machine-learning model and estimating a predicted rate-distortion value for the loss function. The machine-learning model may be trained using the loss function by applying a greater weight to the partition loss function than to the rate-distortion cost loss function. The machine-learning module may comprise a rate-distortion cost estimator that receives a predicted partition from the machine-learning model and estimates a predicted rate-distortion value for the loss function.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
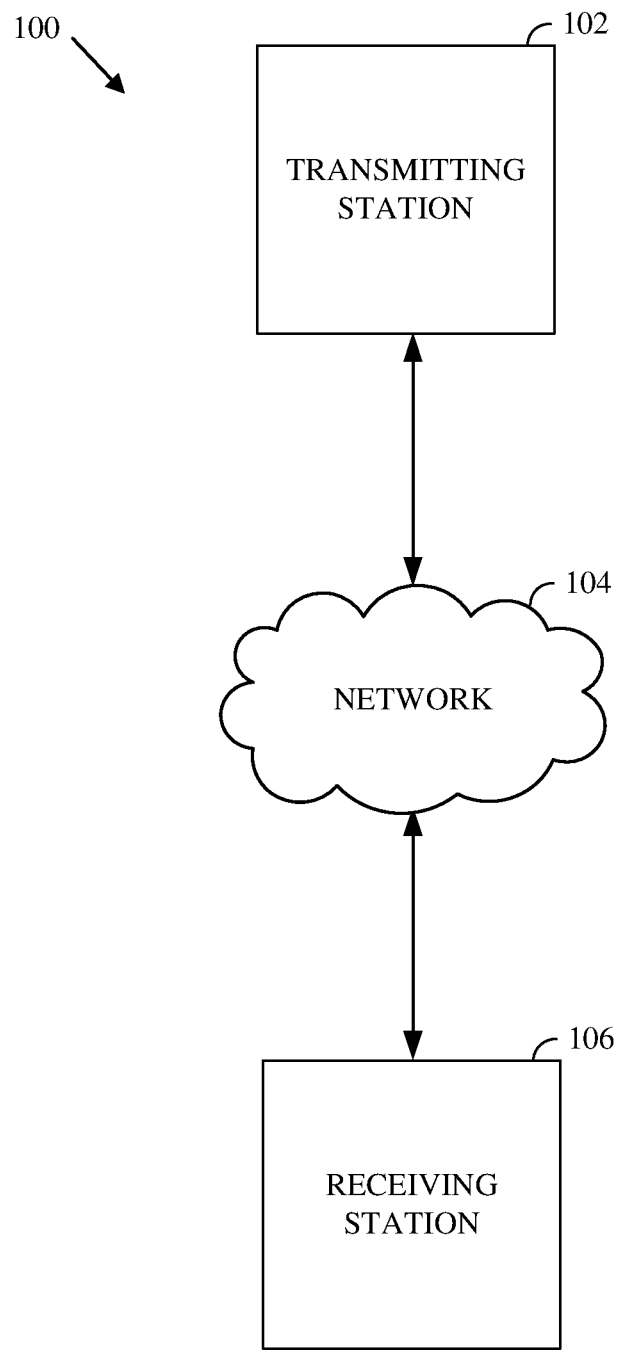
FIG. 1 is a schematic of a video encoding and decoding system.

Encoding techniques may be designed to maximize coding efficiency. Coding efficiency can mean encoding a video at the lowest possible bit rate while minimizing distortion (e.g., while maintaining a certain level of video quality). Coding efficiency is typically measured in terms of both rate and distortion. Rate refers to the number of bits required for encoding (such as encoding a block, a frame, etc.). Distortion measures the quality loss between, for example, a source video block and a reconstructed version of the source video block. For example, the distortion may be calculated as a mean-square error between pixel values of the source block and those of the reconstructed block. By performing a rate-distortion optimization process, a video codec optimizes the amount of distortion against the rate required to encode the video.

Modern video codecs (e.g., H.264, which is also known as MPEG-4 AVC; VP9; H.265, which is also known as HEVC; AVS2; and AV1) define and use a large number of tools and configurations (e.g., parameters) to improve coding efficiency. A video encoder can use a mode decision to examine (e.g., test, evaluate, etc.) at least some of the valid combinations of parameters to select a combination that results in a relatively low rate-distortion value. An example of a mode decision is an intra-prediction mode decision, which determines the best intra-prediction mode for coding a block. Another example of a mode decision is a partition decision, which determines an optimal partitioning of a coding unit (also known as a coding unit or CU). Another example of a mode decision includes a decision as to a transform type to use in transforming a block (such as a residual or an image block) from the pixel domain to the frequency domain to form a transform block that includes transform coefficients.

To evaluate whether one combination is better than another, a metric can be computed for each of the examined combinations and the respective metrics compared. In an example, the metric can combine the rate and distortion described above to produce a rate-distortion (RD) value or cost. The RD value or cost may be a single scalar value.

As mentioned, a best mode can be selected from many possible combinations. For example, the RD cost associated with a specific mode (or a specific combination of tools) may be determined by performing at least a subset of the encoding steps of the encoder. The subset of the encoding steps can include, depending on the mode for which a RD cost is to be determined, at least one of determining a prediction block, determining a residual block, determining a transform type, determining an interpolation filter, quantizing a transform block, entropy encoding, and so on. Note that these encoding steps are neither intended to be an exhaustive list of encoding steps that a typical encoder may perform nor presented in any particular order (that is, an encoder does not necessarily perform these steps, as listed, sequentially). As the number of possible tools and parameters increases, the number of combinations also increases, which, in turn, increases the time required to determine the best mode.

Instead of an exhaustive search, an encoder may terminate a mode search as soon as it finds a mode with a RD cost that is less than a set threshold. This means, however, that a better mode may have been found later on if the encoder had continued in mode search. In some cases, an exhaustive search may or may not be performed, but the entire RD cost calculation is replaced by a coarse estimation. This can further degrade decision making by an encoder.

Techniques such as machine learning may be exploited to reduce the time required to determine a best mode, such as a partition mode. For example, instead of performing all of the encoding steps (i.e., a brute-force or exhaustive approach) for determining the rate and distortion for various partitioning modes to compare those modes and select a best mode, a machine-learning model can be used to estimate the best mode.

The machine-learning model may be trained using the vast amount of training data that is available from an encoder performing standard encoding techniques, such as those described with respect to FIGS. 4 and 6-8. More specifically, the training data can be used during the learning phase of machine learning to derive (e.g., learn, infer, etc.) the machine-learning model that is (e.g., defines, constitutes, etc.) a mapping from the input data (e.g., block data) to an output.

Once a machine-learning model is trained, the model computes the output as a deterministic function of its input. In an example, the machine-learning model can be a neural network model, which can be a convolutional neural-network (CNN). Further details of a neural network model, including a CNN, will be discussed below.

In general, training of a machine-learning model occurs using a loss function. A loss function may be characterized as measuring how well a predicted value of the model, also called a prediction, matches the expected outcome. Common loss functions include mean square error (MSE), binary cross entropy, or cross entropy. A loss function that uses rate and distortion as described herein can result in a better trained model than such loss functions alone, hence improving coding efficiency. Details of such a machine-learning model is described herein first with reference to a block-based codec with the teachings may be incorporated. Although a block-based codec is described as an example, other codecs may be used with the present teachings, including a feature-based codec.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
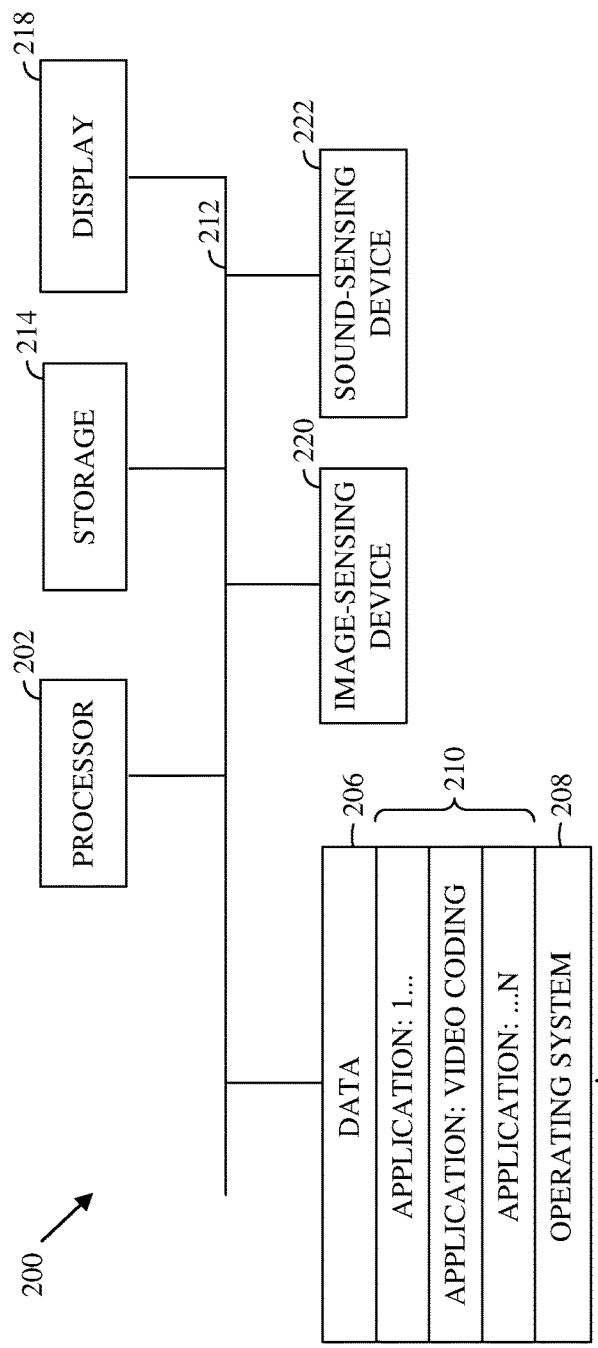
FIG. 2 is a block diagram of an example of a computing device that can implement a transmitting station or a receiving station.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP, e.g., a Hypertext transfer protocol (HTTP)-based video streaming protocol, may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
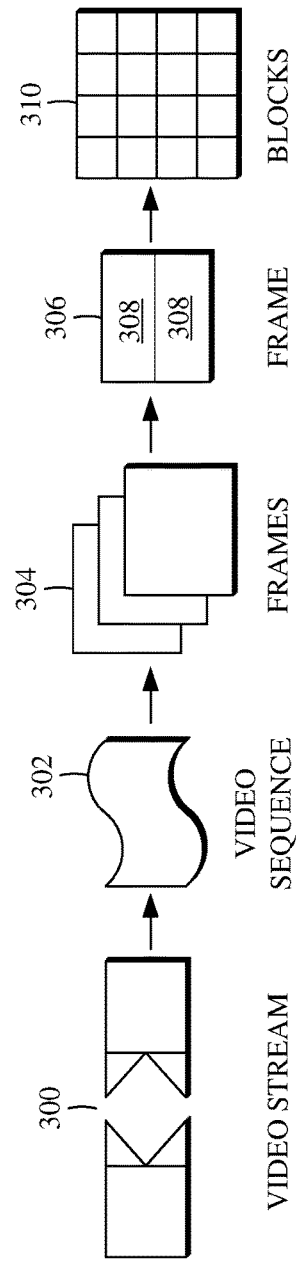
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
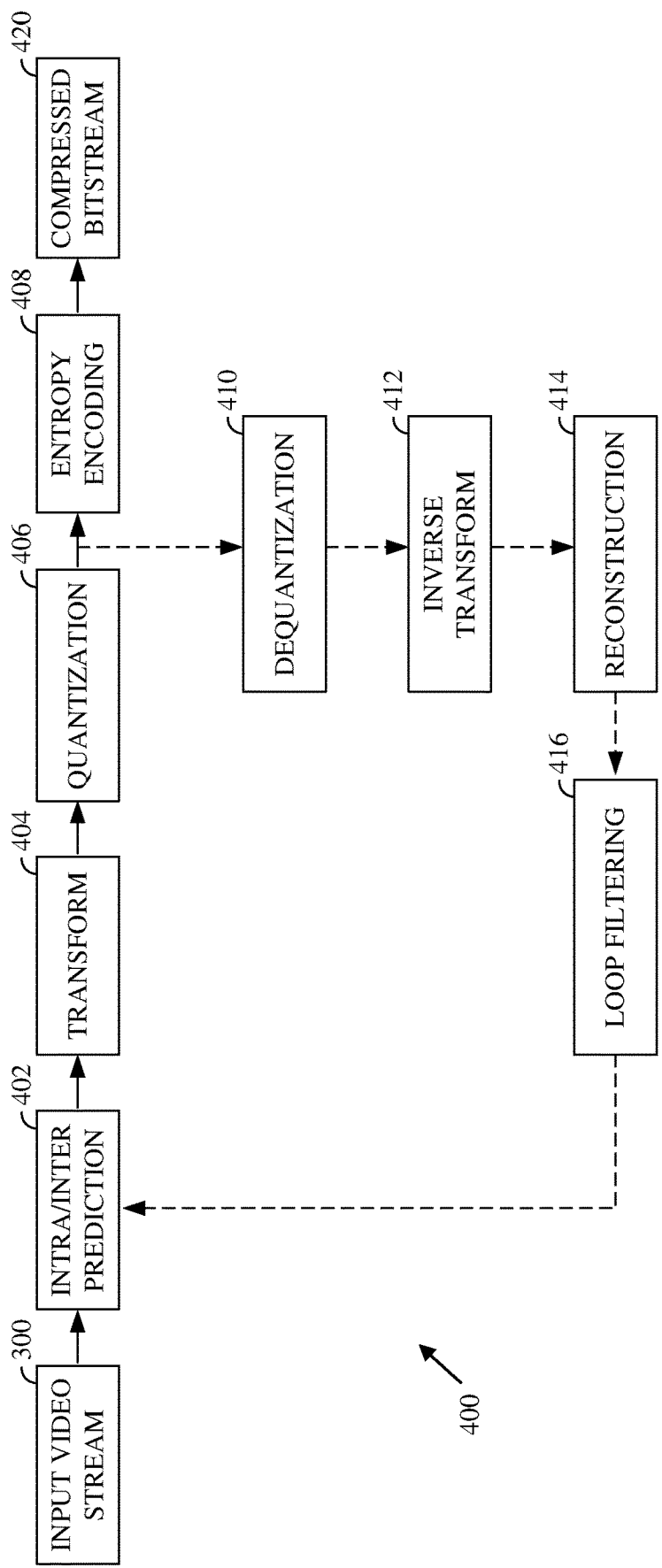
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
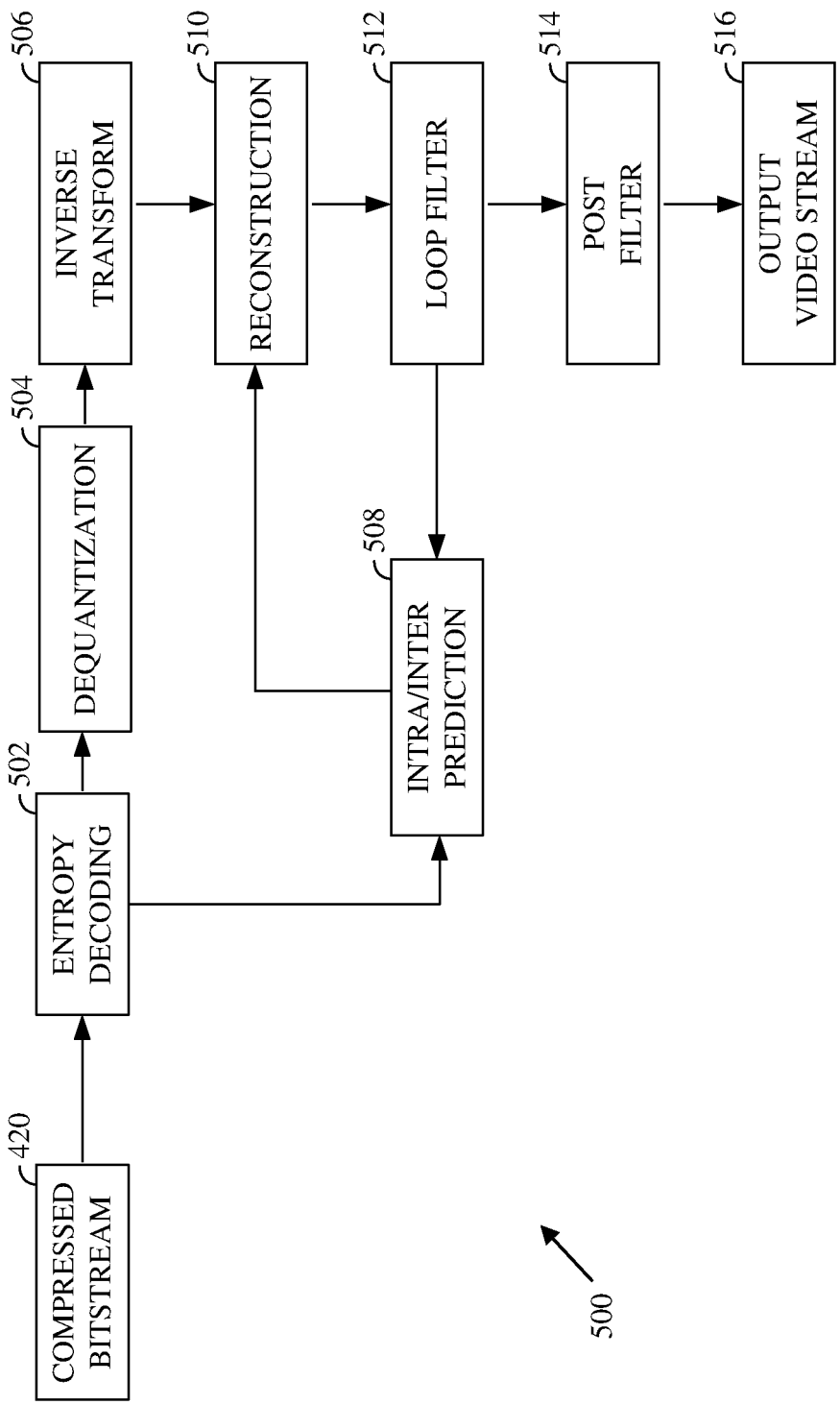
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

Figure 6:
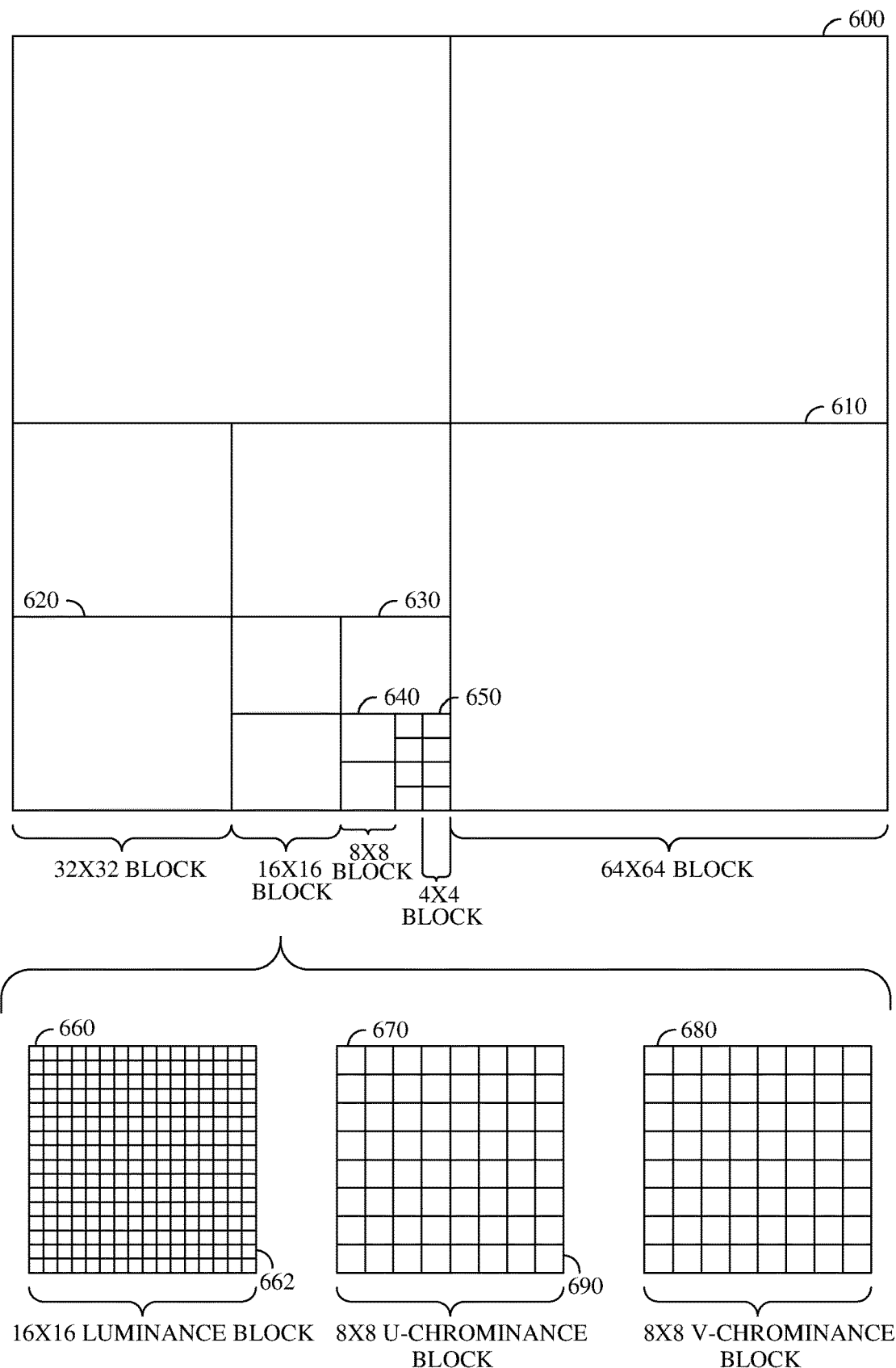
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

Figure 7:
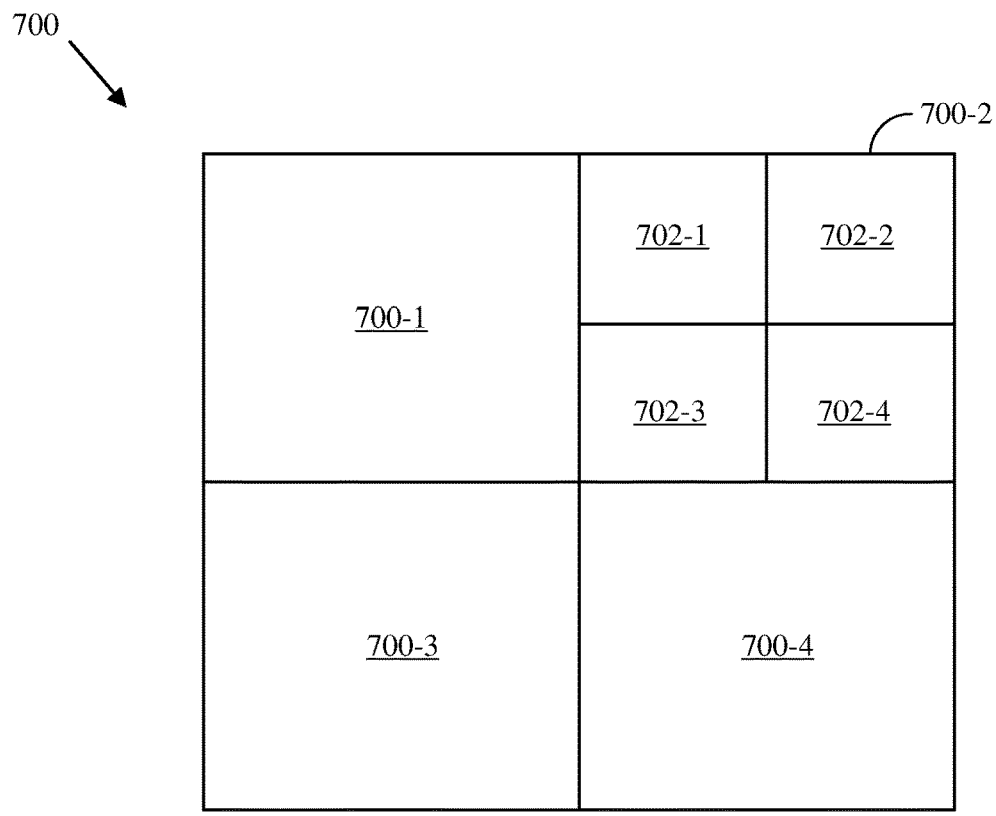
FIG. 7 is a block diagram of an example of a quad-tree representation of a block according to implementations of this disclosure.
Figure 7:
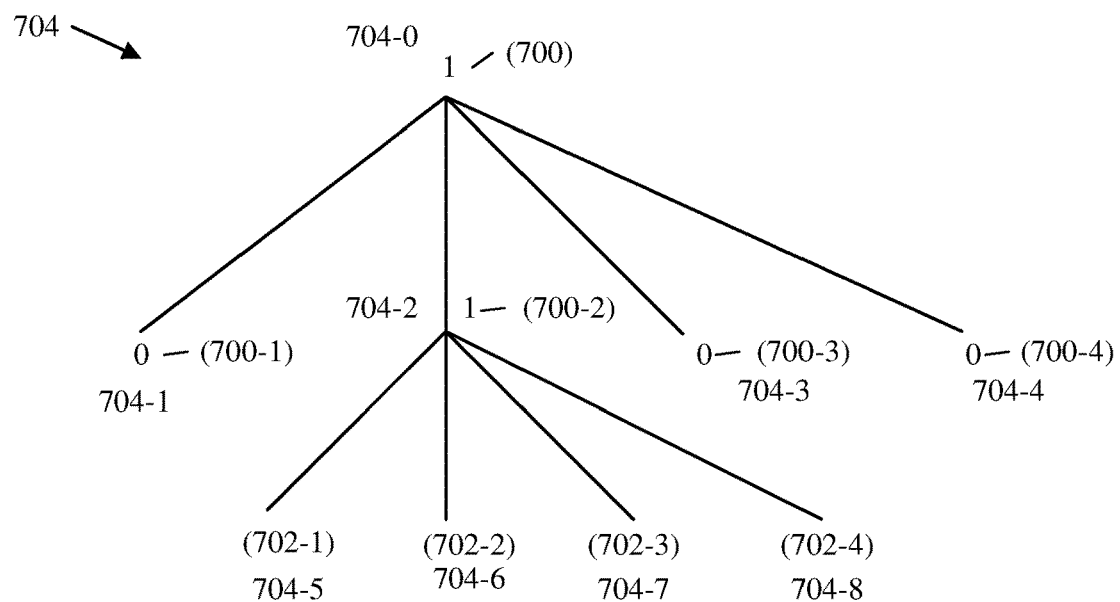

Although other partitions are possible, as described above in regards to FIG. 6, a CU or block may be coded using quad-tree partitioning or coding as shown in the example of FIG. 7. The example shows quad-tree partitioning of a block 700. However, the block 700 can be partitioned differently, such as by an encoder (e.g., the encoder 400 of FIG. 4) or a machine-learning model as described below.

The block 700 is partitioned into four blocks, namely, the blocks 700-1, 700-2, 700-3, and 700-4. The block 700-2 is further partitioned into the blocks 702-1, 702-2, 702-3, and 702-4. As such, if, for example, the size of the block 700 is N×N (e.g., 128×128), then the blocks 700-1, 700-2, 700-3, and 700-4 are each of size N/2×N/2 (e.g., 64×64), and the blocks 702-1, 702-2, 702-3, and 702-4 are each of size N/4×N/4 (e.g., 32×32). If a block is partitioned, it is partitioned into four equally sized, non-overlapping square sub-blocks.

A quad-tree data representation is used to describe how the block 700 is partitioned into sub-blocks, such as blocks 700-1, 700-2, 700-3, 700-4, 702-1, 702-2, 702-3, and 702-4. A quadtree 704 of the partition of the block 700 is shown. Each node of the quadtree 704 is assigned a flag of "1" if the node is further split into four sub-nodes and assigned a flag of "0" if the node is not split. The flag can be referred to as a split bit (e.g., 1) or a stop bit (e.g., 0) and is coded in a compressed bitstream. In a quadtree, a node either has four child nodes or has no child nodes. A node that has no child nodes corresponds to a block that is not split further. Each of the child nodes of a split block corresponds to a sub-block.

In the quadtree 704, each node corresponds to a sub-block of the block 700. The corresponding sub-block is shown between parentheses. For example, a node 704-1, which has a value of 0, corresponds to the block 700-1.

A root node 704-0 corresponds to the block 700. As the block 700 is split into four sub-blocks, the value of the root node 704-0 is the split bit (e.g., 1). At an intermediate level, the flags indicate whether a sub-block of the block 700 is further split into four sub-sub-blocks. In this case, a node 704-2 includes a flag of "1" because the block 700-2 is split into the blocks 702-1, 702-2, 702-3, and 702-4. Each of nodes 704-1, 704-3, and 704-4 includes a flag of "0" because the corresponding blocks are not split. As nodes 704-5, 704-6, 704-7, and 704-8 are at a bottom level of the quadtree, no flag of "0" or "1" is necessary for these nodes. That the blocks 702-5, 702-6, 702-7, and 702-8 are not split further can be inferred from the absence of additional flags corresponding to these blocks. In this example, the smallest sub-block is 32×32 pixels, but further partitioning is possible.

The quad-tree data for the quadtree 704 can be represented by the binary data of "10100," where each bit represents a node of the quadtree 704. The binary data indicates the partitioning of the block 700 to the encoder and decoder. The encoder can encode the binary data in a compressed bitstream, such as the compressed bitstream 420 of FIG. 4, in a case where the encoder needs to communicate the binary data to a decoder, such as the decoder 500 of FIG. 5.

The blocks corresponding to the leaf nodes of the quadtree 704 can be used as the bases for prediction. That is, prediction can be performed for each of the blocks 700-1, 702-1, 702-2, 702-3, 702-4, 700-3, and 700-4, referred to herein as coding blocks. As mentioned with respect to FIG. 6, the coding block can be a luminance block or a chrominance block. It is noted that, in an example, the block partitioning can be determined with respect to luminance blocks. The same partition, or a different partition, can be used with the chrominance blocks.

A prediction type (e.g., intra- or inter-prediction) is determined at the coding block. That is, a coding block is the decision point for prediction.

A mode decision process (e.g., partition decision process) determines the partitioning of a coding block, such as the block 700. The partition decision process calculates the RD costs of different combinations of coding parameters. That is, for example, different combinations of prediction blocks and predictions (e.g., intra-prediction, inter-prediction, etc.) are examined to determine an optimal partitioning.

As a person skilled in the art recognizes, many mode decision processes can be performed by an encoder.

Figure 8:
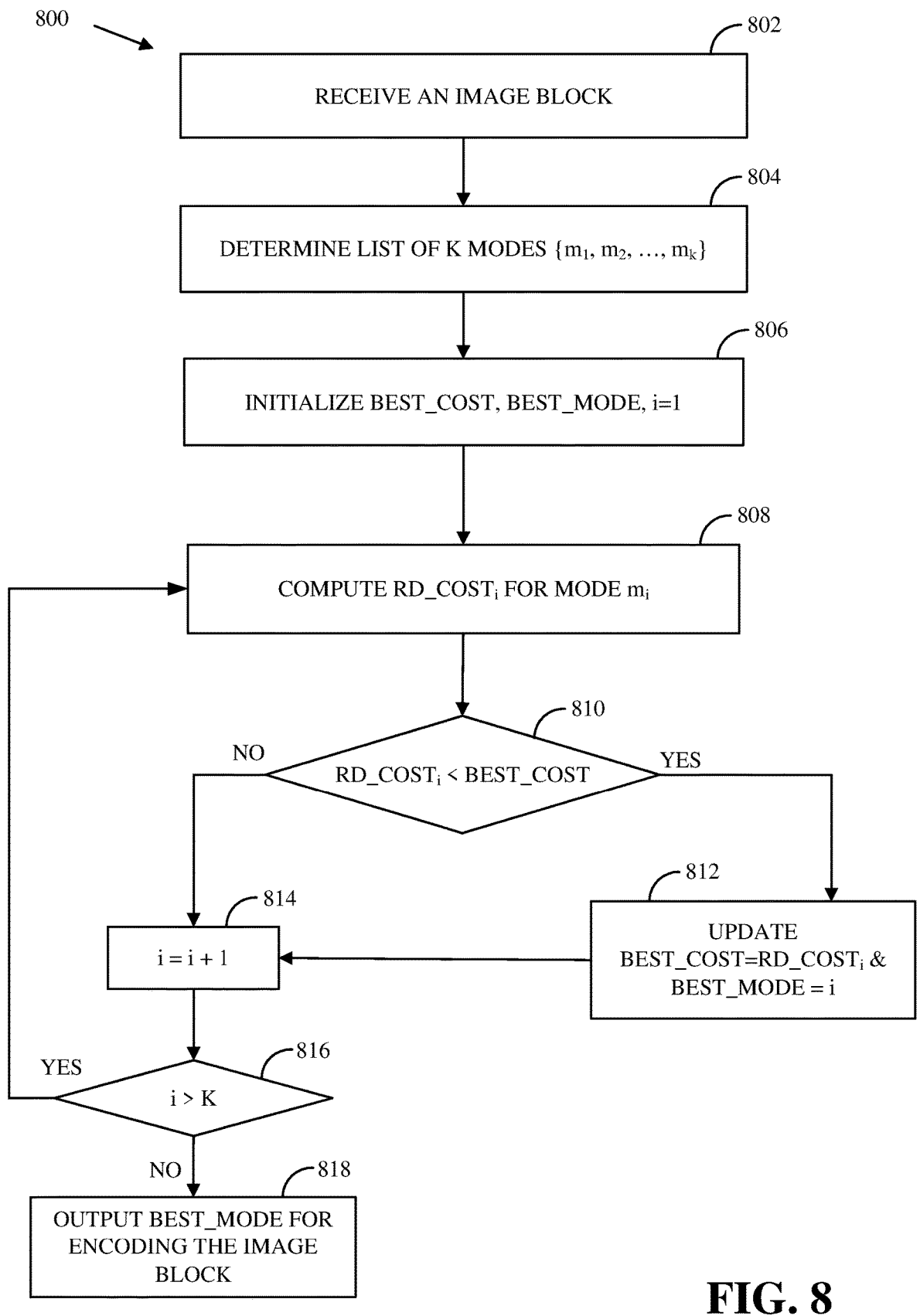
FIG. 8 is a flowchart of a process for searching for a best mode to code a block.

FIG. 8 is a flowchart of a process 800 for searching for a best mode to code a block. The process 800 is an illustrative, high level process of a mode decision process that determines a best mode. For ease of description, the process 800 is described with respect to selecting an intra-prediction mode for encoding a prediction block. Other examples of best modes that can be determined by processes similar to the process 800 include determining a transform type and determining a transform size. The process 800 can be implemented by an encoder, such as the encoder 400 of FIG. 4, using a brute-force approach to mode decision.

At 802, the process 800 receives an image block. As the process 800 is described with respect to determining an intra-prediction mode, the image block can be a prediction unit. As described with respect to FIG. 7, each of the leaf node coding blocks (e.g., a block 700-1, 702-1, 702-2, 702-3, 702-4, 700-3, or 700-4) can be partitioned into one or more prediction units until a smallest prediction unit/block size is reached such that further partitioning is not possible. The image block can be one such prediction unit.

At 804, the process 800 determines (e.g., selects, calculates, choses, etc.) a list of modes. The list of modes can include K modes, where K is an integer number. The list of modes can be denoted $\{m_1, m_2, \ldots, m_k\}$. The encoder can have available a list of intra-prediction modes. For example, the list of available intra-prediction modes can be {DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, PAETH_PRED}. A description of these intra-prediction modes is omitted as the description is not pertinent to the understanding of this disclosure. The list of modes determined at 804 can be any subset of the list of available intra-prediction modes.

At 806, the process 800 initializes a BEST_COST variable to a high value (e.g., INT_MAX, which may be equal to 2,147,483,647) and initializes a loop variable i to 1, which corresponds to the first mode to be examined.

At 808, the process 800 computes (e.g., calculates) an $RD\_COST_i$ for the $mode_i$. At 810, the process 800 tests whether the RD cost, $RD\_COST_i$, of the current mode under examination, $mode_i$, is less than the current best cost, BEST_COST. If the test is positive, then at 812, the process 800 updates the best cost to be the cost of the current mode (i.e., $BEST\_COST=RD\_COST_i$) and sets the current best mode index (BEST_MODE) to the loop variable i (BEST_MODE=i). The process 800 then proceeds to 814 to increment the loop variable i (i.e., i=i+1) to prepare for examining the next mode (if any). If the test is negative, then the process 800 proceeds to 814.

At 816, if there are more modes to examine, the process 800 proceeds back to 808; otherwise the process 800 proceeds to 816. At 816, the process 800 outputs the index of the best mode, BEST_MODE. Outputting the best mode can mean returning the best mode to a caller of the process 800. Outputting the best mode can mean encoding the image using the best mode. Outputting the best mode can have other semantics. The process 800 terminates at 820.

FIG. 8 illustrates that a brute-force approach to mode decision is largely a serial process that essentially codes an image block X by using candidate modes to determine the mode with the best cost. Machine learning can be used to reduce the computational complexity in mode decisions. That is, mode decisions of an encoder may be implemented using deep learning. Deep learning refers to machine-learning models where the network learns from unstructured or unlabeled data, and a deep-learning model may be referred to as a deep neural network.

At a high level, and without loss of generality, a machine-learning model, such as a classification deep-learning model, includes two main portions: a feature-extraction portion and a classification portion. The feature-extraction portion detects features of the model. The classification portion attempts to classify the detected features into a desired response. Each of the portions can include one or more layers and/or one or more operations.

Figure 9:
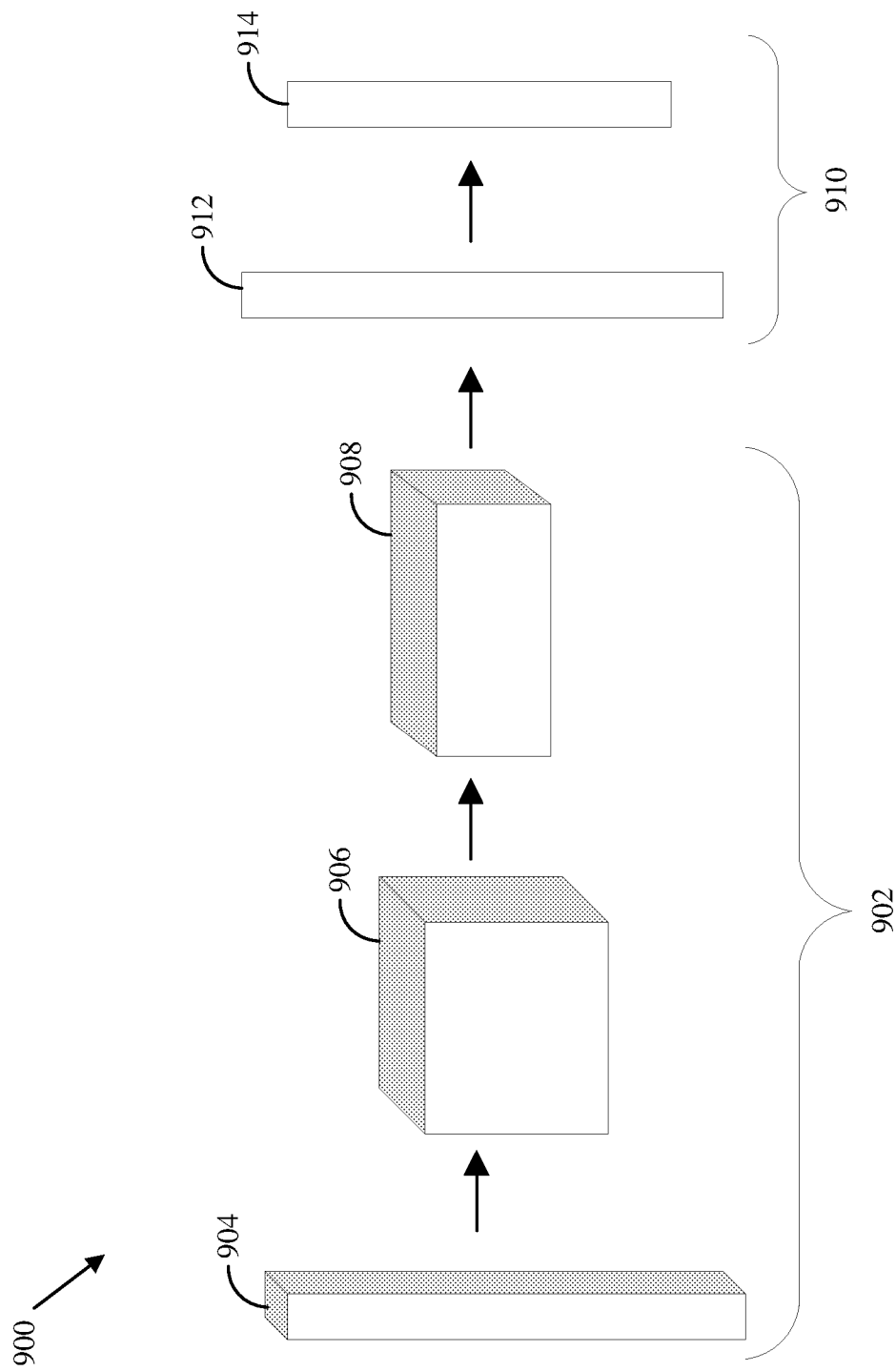
FIG. 9 is a simplified representation of a convolution neural network that can used to implement the teachings herein.

As mentioned above, a CNN is an example of a machine-learning model. A simplified CNN 900 is shown in FIG. 9.

In this CNN 900, the feature-extraction portion 902 includes a set of convolutional operations, which may be a series of filters arranged in convolution layers 904, 906, 908 that are used to filter an input image based on a filter (typically a square of size k, without loss of generality). For example, and in the context of machine vision, these filters can be used to find features in an input image. The features can include, for example, edges, corners, endpoints, and so on. As the number of stacked convolutional operations increases, later convolutional operations can find higher-level features.

In the CNN 900, a number of fully connected (FC) layers 912, 914 may look at all the input features of an image in order to generate a high-level classifier. Several stages (e.g., a series) of high-level classifiers eventually generate the desired classification output. Collectively, these classifiers form a classification portion 910.

As can be discerned from this description, a CNN network is often composed of a number of convolutional operations (e.g., the convolution layers 904, 906, 908 of the feature-extraction portion 902) followed by a number of FC layers 912, 914 forming a classification portion. The number of operations of each type and their respective sizes are typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the feature-extraction portion 902) and/or the fully connected operation (i.e., in the classification portion 910). The FC layers 912, 914 may be referred to as Dense operations. As a person skilled in the art recognizes, a convolution operation of any of the convolution layers 904, 906, 908 can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN 900 is reached. Similarly, a Dense layer can be a group of operations or layers starting with a Dense operation (i.e., a FC layer 912, 914) followed by zero or more operations (e.g., Pooling, Dropout, Activation, Normalization, BatchNormalization, other operations, or a combination thereof) until another convolution layer, another Dense layer, or the output of the CNN 900 is reached. The boundary between feature-extraction portion 902 based on convolutional networks and a feature classification portion 910 using Dense operations can be marked by a Flatten operation, which flattens the multidimensional matrix from the feature extraction into a vector.

In the CNN 900, each of the convolution layers 904, 906, 908 may consist of a set of filters. While a filter is applied to a subset of the input data at a time, the filter is applied across the full input, such as by sweeping over the input. The operations performed by a convolution layer are typically linear/matrix multiplications. The output of the convolution filter may be further filtered using an activation function. The activation function may be a linear function or non-linear function (e.g., a sigmoid function, an arcTan function, a tan H function, a ReLu function, or the like).

Each of the FC layers 912, 914 is a linear operation in which every input is connected to every output by a weight. Linear operations of the FC layers are generally followed by a non-linear activation function to generate an output of a layer. When a Flatten operation (e.g., a flattening layer) exists between the last convolution layer (e.g., the convolution layer 908) and the first FC layer (e.g., the FC layer 912), the number of parameters of the entire neural network is dominated by the number of parameters at this interface.

It is noted that details of machine learning, convolutional neural networks, and/or details that are known to a person skilled in the art are omitted herein. For example, a skilled person in the art recognizes that the values of convolutional filters and the weights of connections between nodes (i.e., neurons) in the CNN 900 are determined by the CNN 900 during the training phase. Accordingly, such are not discussed in detail herein.

One problem in training a model for the partitioning decision described in regards to FIGS. 7 and 8 is that the partition decision relies on very non-linear operations. For example, and as described above in regards to FIG. 4, a block residual is a (linear) difference between an image block and a prediction block (e.g., at the intra/inter-prediction stage 402), but that residual is then subjected to non-linear operations including computing the transform of the residual (e.g., at the transform stage 404), and applying quantization to the transformed residual (e.g., at the quantization stage 406). Further, computing the number of bits (rate R) required to encode the image block rate and the distortion D between the image block and a reconstructed version of the image block (e.g., as performed by the reconstruction path in FIG. 4) to obtain the RD cost as a scalar value D+λR also involves non-linear operations. For example, the distortion can be a mean square error, a sum of absolute differences error, or some other error metric between pixel values of the image block and the reconstructed block.

The Lagrangian parameter or Lagrange multiplier λ itself may have a non-linear relationship to the quantization parameter QP used in quantization of the transformed residual. For example, codecs that implement the H.264 or HEVC standard may derive the multiplier according to $0.85 \times 2^{(QP-12)/3}$, codecs that implement the H.263 standard may derive the multiplier according to $0.85 \cdot QP^2$, codecs that implement the VP9 standard may derive the multiplier according to $88 \cdot QP^2/24$, and codecs that implement the AV1 standard may derive the multiplier according to $0.12 \cdot QP^2/256$.

To approximate the partitioning problem with a machine learning or deep learning model, labeled partitions (e.g., from an exhaustive encoder partitioning described above in regards to FIG. 7) may be compared with predicted partitions using a loss function. As described above, for example, a loss function measures how well a predicted value p of the model matches the expected outcome y, in this example how a predicted partition of a block matches the labeled partition of the block from the training data. A loss function may be a MSE loss function, a binary cross entropy loss function, or a cross entropy loss function.

The Formula for a MSE Loss Function is:

$$MSE(y, p) = \frac{1}{N}\sum_n \left(y^{[n]} - p^{[n]}\right)^2,$$

where [n] represents sample n, and N represents the total number of samples. The formula for a binary cross entropy function is:

$$BinaryCrossEntropy(y, p) = \frac{1}{N}\sum_n \left(y^{[n]}\log(p^{[n]}) + (1-y^{[n]})\log(1-p^{[n]})\right).$$

The cross entropy function is the general case of the binary cross entropy function where there are only two choices. The decision process may be represented by one prediction variable taking value in a finite alphabet A. The decision process may be as shown in the formula for a cross entropy function as follows:

$$CrossEntropy(y, p) = \frac{1}{N}\sum_n \sum_i \left(y_i^{[n]}\log(p_i^{[n]})\right),$$

where i represents the index of the choice of the prediction variable in A. In the binary case, for example, i is either 0 or 1. In the case where the prediction variable may take values in the alphabet {0, 1, . . . A−1} (e.g., A>2), i can be 0, . . . , A−1 . . . . In other words, the function iterates over the number of available prediction classes using the index i. For the two-class problem (e.g., the quad-tree split or non-split), the cross entropy function can be reduced to the binary cross entropy function above.

As described above in regards to FIGS. 6 and 7, the partition decision may be a quad-tree decision process. In such a process, a non-split decision for a block of dimensions b×b (also referred to herein as the block b×b) implies that remaining loss functions for the corresponding remaining split decisions of the sub-blocks of dimensions b/2×b/2 (also referred to herein as the block b/2×b/2) do not need to be evaluated. Assuming in this example that the largest block dimensions are 64×64 pixels, and the smallest block partitioning is 8×8 pixels, a modified binary entropy loss function that may be used is as follows:

$$y_{64}\log(p_{64}) + (1-y_{64})(\log(1-p_{64}) + \Sigma_{i=0}^3 y_{32}^i \log(p_{32}^i) + \\ (1-y_{32}^i)(\log(1-p_{32}^i) + \Sigma_{j=0}^3 (y_{16}^{i,j} \log(p_{16}^{i,j}) + (1- \\ y_{16}^{i,j})\log(1-p_{16}^{i,j}))) \quad (1)$$

In the above, $y_{64}$ and $p_{64}$ correspond to the labeled partition and the predicted partition (or prediction) for a 64×64 block, respectively. Similarly, $y_{32}^i$ and $p_{32}^i$ correspond to the labeled partition and prediction for the 32×32 blocks, respectively, and $y_{16}^{i,j}$ and $p_{16}^{i,j}$ correspond to the labeled partition and prediction for the 16×16 blocks, respectively. When all of the corresponding blocks are split, an 8×8 partitioning is assumed. This is one example of the modified loss function. Additional or fewer terms may be included. For example, an additional term would be added where the largest block dimensions are 128×128 pixels.

One problem with the above technique is that it weights different partition decisions equally. Additional benefits may result from the inclusion of a weighted function for the different partition decisions. This modifies the loss function of formula (1) to the following:

$$w_{64}y_{64}\log(p_{64}) + (1-y_{64})(\log(1-p_{64}) + w_{32}\Sigma_{i=0}^3 y_{32}^i \log \\ (p_{32}^i) + (1-y_{32}^i)(\log(1-p_{32}^i) + w_{16}\Sigma_{j=0}^3 (y_{16}^{i,j} \log \\ (p_{16}^{i,j}) + (1-y_{16}^{i,j})\log(1-p_{16}^{i,j}))) \quad (2)$$

The weighted function may proportionally weight the partition decisions, such as by applying a proportional factor to the rate and distortion costs. The proportional factor of the weighted function may be developed by considering the rate and distortion costs resulting from the partition decisions. At each partition decision, for example, an encoder may perform a comparison as follows:

$$RDC_{b \times b} = RDC_{b \times b}^{nonsplit} < > \Delta_{b \times b} \Sigma_{i=0}^3 RDC_{b/2 \times b/2}^i \quad (3)$$

Formula (3) determines rate and distortion for a block of dimensions b×b (also referred to as block b×b) and computes recursively the best decision for each sub-block i, where $RDC_{b \times b}^{nonsplit}$ is the RD cost for not splitting the block b×b, $RDC_{b \times b}$ is the best RD cost between the splitting and non-splitting decisions for the block b×b, $RDC_{b/2 \times b/2}^{i}$ is the best RD cost between the splitting and non-splitting decisions for the sub-blocks of dimensions b/2×b/2, and $\Delta_{b \times b}$ is the additional cost incurred when splitting the block b×b. In other words, formula (3) compares the costs of not splitting a block b×b with the costs of splitting the block b×b into four b/2×b/2 sub-blocks, and selects the lower cost to make the partition decision.

Formula (3) may be converted into a loss function for training a deep-learning model by recognizing that the decision of whether or not to split is a binary decision. Assuming that the variable $p_b$ represents the decision of a block, then the variable $p_b$ may belong to the set of 0 and 1 ($p_b \in [0,1]$). For labeled training data, the variable $p_b$ can have a value of 0 or 1 in this example. As a result, the RD cost is $RDC_{b \times b}^{nonsplit}$ when $p_b=1$, and the RD cost is $\Delta_{b \times b} + \sum_{i=0}^{3} RDC_{b/2 \times b/2}^{i}$ when $p_b=0$. More generally, multiplying the non-split decision by the variable $p_b$, and multiplying the split decision by the expression $(1-p_b)$ results in the following loss function:

$$RDC_{b/2 \times b/2} = p_b RDC_{b \times b}^{nonsplit} + (1-p_b)(\Delta_{b \times b} \Sigma_{i=0}^{3} RDC_{b/2 \times b/2}^{i}) \quad (4)$$

Making the same assumptions as those made in regards to formulas (1) and (2), formula (4) may be expanded to consider all partitions of the recursive partitioning decision, resulting in the following loss function:
$RDC(p) = p_{64} RDC_{64}^{nonsplit} + (1-p_{64})(\Delta_{64} \Sigma_{i=0}^{3}$
$RDC_{32}^{i,nonsplit} + (1-p_{32}^{i}) RDC_{32}^{i,split})$, where $RDC_{32}^{i,split}$ may represent the calculation of costs of whether or not to further split the i-th 32×32 block as follows:

$$\Delta_{32} \Sigma_{j=0}^{3} p_{16}^{i,j} RDC_{16}^{i,j,nonsplit} + (1-p_{16}^{i,j}) RDC_{16}^{i,j,split}$$

Accordingly, RDC(p) may be represented by the following:

$$\begin{aligned} RDC(p) = &p_{64} RDC_{64}^{nonsplit} + (1-p_{64})(\Delta_{64} + \Sigma_{i=0}^{3} \\ &(p_{32}^{i} RDC_{32}^{i,nonsplit} + (1-p_{32}^{i})(\Delta_{32}^{i} + \Sigma_{j=0}^{3} (p_{16}^{i,j} \\ &RDC_{16}^{i,j,nonsplit} + (1-p_{16}^{i,j}) RDC_{16}^{i,j,split})))) \end{aligned} \quad (5)$$

Assuming that an encoder performs an exhaustive search for the lowest (i.e., best) RD cost, that lowest RD cost may be referred to as $RDC_{MIN}$. The weight applied to a partition decision of the partition decisions may be equal to the rate-distortion value of the partition decision normalized by a lowest rate-distortion value resulting from the plurality of partition decisions. That is, the proportional factor may be $1/RDC_{MIN}$. This may be seen by dividing RDC(p) in formula (5) by $RDC_{MIN}$, resulting in the following:

$$\begin{aligned} RDC'(p) = &p_{64} w_{64} + (1-p_{64})(o_{64} + \Sigma_{i=0}^{3} (p_{32}^{i} w_{32}^{i} + (1-p_{32}^{i}) \\ &(o_{32}^{i} + \Sigma_{j=0}^{3} (p_{16}^{i,j} w_{16}^{i,j} + (1+p_{16}^{i,j}) \ldots)))) \end{aligned} \quad (6)$$

where the constant (the weight) $w_b = RDC_b^{nonsplit}/RDC_{MIN}$ and the constant $o_b = \Delta_b / RDC_{MIN}$. In this example, a predicted rate-distortion value comprises a first term representing a rate-distortion cost of a non-splitting decision for a block and a second term representing a rate-distortion cost of a splitting decision for the block that splits the block into a plurality of sub-blocks. The rate-distortion cost of the splitting decision for the block that splits the block into the plurality of sub-blocks may comprise a respective rate-distortion cost for partition decisions of each of the plurality of sub-blocks. As can be seen from formula (6), the rate-distortion cost of the first term is weighted by a lowest rate-distortion value for encoding the training block. Similarly, the rate-distortion cost of the second term comprises weighting each of the respective rate-distortion costs for partitioning each of the plurality of sub-blocks by the lowest rate-distortion value for encoding the training block.

It is worth noting that $RDC'(p) \geq 1$ in formula (6). This is because $RDC'(p)=1$ is the minimum RD cost for the partition of the 64×64 block resulting from the exhaustive search, and the prediction will not produce a lower RD cost than this minimum RD cost. From this knowledge, formula (6) may develop a rate-distortion cost loss function Loss (RDC) that is based upon a relationship between rate-distortion values and respective predicted rate-distortion values. In this example, it is the relationship between the labeled data y and prediction data p for respective partition decisions, where a partition decision may comprise a combination of splitting and non-splitting decisions of the block. The rate-distortion cost loss function may be a MSE function or an exponential function. One example of an exponential function is as follows:

$$Loss(RDC) = e^{RDC'(p)} - e^{RDC(y)} = e^{RDC'(p)} - e^{RDC(1)} \quad (7)$$

where $RDC(y) = RDC(1) = RDC_{MIN}$

The rate-distortion cost loss function of formula (7) exponentially penalizes a bad decision. A bad decision is a decision that is less than optimal, e.g., the predicted RD cost for a partition is higher than the RD cost of the labeled data used for training. In other words, the rate-distortion cost loss function exponentially penalizes a predicted partition that does not match a selected partition decision for the training block that results from an exhaustive partition search (e.g., of a block-based encoder). Further, this determination is relatively low in complexity. This low complexity is due to the ability to normalize the RD costs by dividing them by the RD cost of the labeled data because the RD cost of the best partition (e.g., $RDC_{MIN}$) is known.

Further benefits can result from recalling per formulas (1) and (2) that an encoder can select the best partition by computing and comparing RD costs for all partition types. For this reason, the partition determined by an encoder is a good target for a machine-learning model. A combined loss function that incorporates a partition loss function with the RDC-based cost function of formula (7), which penalizes the bad decisions, is as follows:

$$Loss = \alpha Loss(partition) + \beta Loss(RDC) \quad (8)$$

In formula (8), the partition loss function Loss(partition) may be based on a relationship between partition decisions of training blocks and respective predicted partitions. The partition loss function may be a MSE loss function, a binary cross-entropy loss function, or a cross-entropy loss function. For example, the hierarchical binary cross-entropy loss function of formula (1) or the weighted loss function of formula (2) may be used. The loss function of formula (8) may weight the partition loss function and the rate-distortion cost loss function differently to determine the combined loss function. The weighting may be achieved using the variables $\alpha$ and $\beta$. The variables $\alpha$ and $\beta$ are multipliers to balance the weight of these functions, and may be pre-defined or tuned during training. For example, the function Loss(RDC) may be used to first train the model, and then the function Loss(partition) may be used to fine tune the model. In an example $\alpha + \beta = 1$, where $1 > \alpha$, $\beta > 0$. The variable $\alpha$ may be 10%, and the variable $\beta$ may be 90%. Other values for the variables $\alpha$ and $\beta$ are possible to weight the partition loss function and the rate-distortion cost loss function. In some implementations, the machine-learning model may be trained/tuned using the loss function by applying a greater weight to the partition loss function than to the rate-distortion cost loss function.

Comparing formula (6), which is used in developing formulas (7) and (8), with formula (2), it can be seen that formula (6) improves the use of a weighted function by allowing the weight $w_b$ to be adjusted for each block of the different partition decisions. Formula (2), in contrast, uses a fixed value for the weight $w_b$.

Figure 10A:
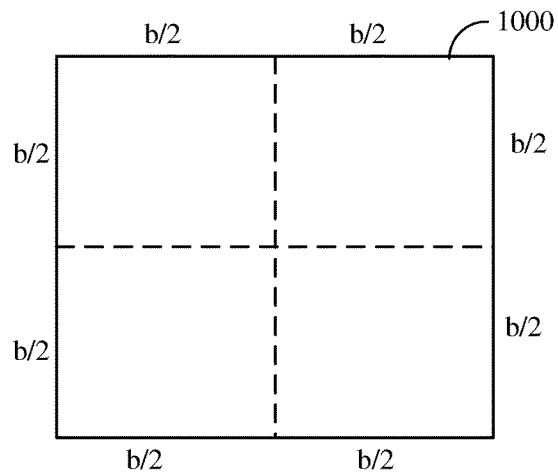
FIG. 10A is an example of a partition decision for a b×b block with relatively uniform content.
Figure 10B:
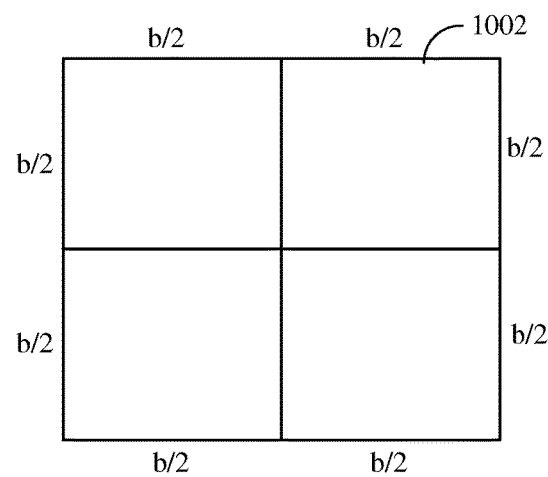
FIG. 10B is an example of a partition decision for a b×b block with more detail than the block of FIG. 10A.

The desirability of adjusting values of the weight $w_b$ of the weighted function can be seen by reference to FIGS. 10A and 10B. FIG. 10A illustrates a partition decision for a b×b block 1000 with relatively uniform content, and FIG. 10B illustrates a partition decision for a b×b block 1002 with more detailed content (e.g., more differences in the pixel values than the relatively uniform content of FIG. 10A).

A partition decision process performed by a (e.g., software) encoder can be used to extract the partition $y_b$, and the partition prediction obtained from a machine learning/deep learning model is identified as $p_b$. In FIG. 10A, due to the relatively uniform content, the encoder is most likely to set $y_b$ to a value such that the b×b block 1000 should not be split (i.e., not partitioned into b/2×b/2 blocks shown by the dashed lines) because the block 1000 may be represented by a single (intensity and color) component. In an example, $y_b=1$. If the partition prediction $p_b$ is a wrong decision, at most the partition loss cost will be $w_b$ when Loss(partition) is a weighted loss function. In some cases, the RD costs for the non-split and split decisions may be very similar. As a result, the RD costs can be almost the same, yielding a small penalty. That is, Loss(RDC) is small.

In FIG. 10B, an encoder is more likely to set $y_b$ to a value such that the b×b block 1000 should be split (i.e., partitioned into b/2×b/2 blocks shown by the solid) due to the additional detail that makes representation by a single component undesirable. For example, $y_b=0$ for the block 1002. If a bad decision is made by the model in FIG. 10B (e.g., to not split the b×b block 1000), a penalty of at most $w_b$ results if the partitions are weighted by $w_b$ as described in formula (2). However, in contrast to FIG. 10A, the RD cost difference is likely to be substantially higher. This difference would be signaled by the exponential penalty represented by Loss (RDC) in formula (8).

Accordingly, and in general, the rate in the RD cost is used to take into account how an encoder works with the given content. In other words, rate provides an estimate about the complexity of a block given the encoder. Such complexity aspects are not captured in distortion.

While the examples and formulas thus far described are expressed using only quadtree partitions, many codecs support non-quadtree (e.g., non-square) partitions. The following formulas extend the teachings herein to non-quadtree partitions through their inclusion in formula (5), and through that to inclusion in the calculation of Loss(RDC):

$$RDC_{b \times b} = \Sigma_i p_{b,i} RDC_{b \times b}^i \text{ and} \quad (9)$$

$$RDC_{b \times b}^i = \Delta_{b \times b}^i + \Sigma_k RDC_{sub\text{-}partition(k)}^i \quad (10)$$

In formulas (9) and (10), i is the index of the non-quadtree partitions to be considered for the current block size b×b. Further, k is the index of sub-partitions within a current partition i such that $RDC_{sub\text{-}partition(k)}^i$ is the RD cost for the current sub-partition k of the current non-quadtree partition i. For example, and referring to FIG. 11, every block size level down to the minimum block size (here b/8×b/8) involves a decision of whether to perform a vertical partition, a horizontal partition, a split partition, or no partition.

The decision, at a particular block size level, as to whether or not to partition and which partition is best may be based on error values such as the RD cost. If there is no partition at a block size level, further partitioning does not occur. Also, in this example, if the vertical or horizontal partition is selected, further partitioning to child nodes does not occur. If the split partition is selected, further partitioning is possible.

In this example, when the largest CU is a b×b block, a partition or non-partition decision is made. No partition results in a final block size of b×b pixels. Otherwise, a vertical partition of a b×b block comprises two partitions k of b/2×b pixels, a horizontal partition of a b×b block comprises two partitions k of b×b/2 pixels), or a split partition of a b×b block comprises four partitions of b/2×b/2 each. When considering whether the split partition mode is the best mode, recursive partitioning of each of the b/2×b/2 blocks is considered (noted by "R" in FIG. 11). When considering each of the b/2×b/2 blocks as part of this recursive partitioning, another partition or non-partition decision is made. No partition of a b/2×b/2 block results in a final block size of b/2×b/2 pixels. When a b/2×b/2 block is partitioned, the vertical partition comprises two partitions k of b/4×b/2 pixels, the horizontal partition comprises two partitions k of b/2×b/4 pixels, or the split partition comprises four partitions of b/4×b/4 each. Similarly, when the split partition of the b/2×b/2 block occurs, another partition or non-partition decision of each b/4×b/4 block is considered. No partition of a b/4×b/4 block results in a final block size of b/4×b/4 pixels. The vertical partition of a b/4×b/4 block comprises two partitions k of b/8×b/4 pixels, the horizontal partition of a b/4×b/4 block comprises two partitions k of b/4×b/8 pixels, and the split partition of a b/4×b/4 block comprises four partitions of b/8×b/8 pixels each.

Figure 11:
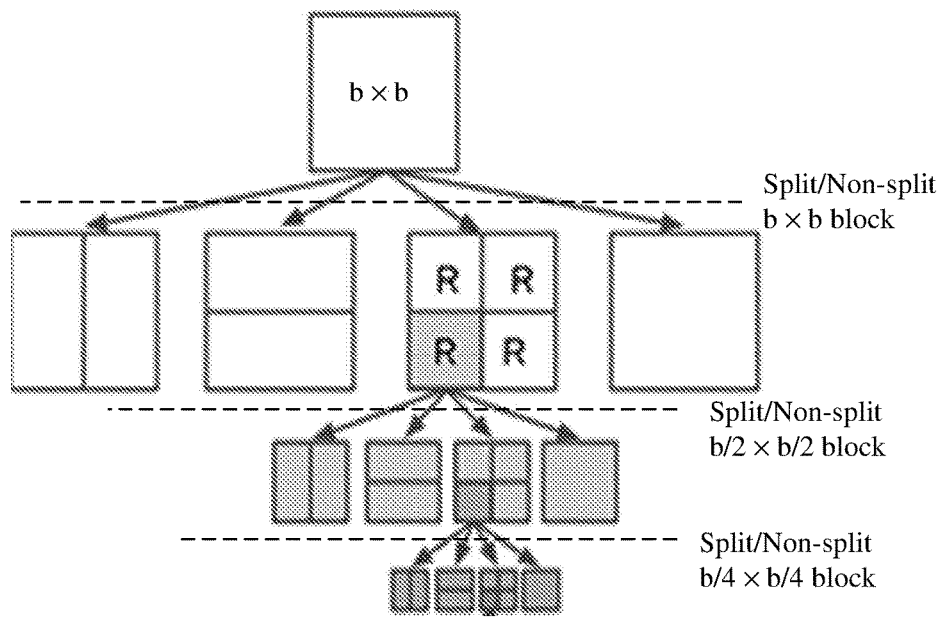
FIG. 11 is a diagram that illustrates partition modes of a block, and recursive partitioning.

As can be discerned from FIG. 11, and in view of FIG. 7, a partition can be represented by a tree. A tree can be represented by a vector. If P denotes the set of all valid partitions (or, equivalently, the respective representations of the partitions), a CNN can be trained to infer a mapping into the set P. Training a CNN to infer the partitions includes defining an appropriate set P and using appropriate training data for each index i, k of the set P. For example, where a codec uses a coding unit size of 64×64 and the four basic partition types, for quadtree partitions only there are 21 decisions corresponding to one 64×64 partition decision, four 32×32 partition decisions, and sixteen 16×16 partition decisions. In a case where a CNN is used to also determine non-quadtree partitions, then there are 21*4=84 possible decisions, where 21 corresponds to the quadtree partitions and 4 corresponds to the four basic partition types of FIG. 11.

Additional partition types may result from modifications to the vertical and horizontal partition types. For example, a non-square partition can correspond to an internal node of the quadtree having a number of children that is greater than or equal to two children. A partition type may split a b×b block into two horizontally adjacent square blocks, each of size b/2×b/2, and a rectangular prediction unit of size b×b/2. A partition type may split a b×b block into a rectangular prediction unit of size b×b/2 and two horizontally adjacent square blocks, each of size b/2×b/2. A partition type may split a b×b block into two vertically adjacent square blocks, each of size b/2×b/2, and a rectangular prediction unit of size b/2×b. A partition type may split a b×b block into a rectangular prediction unit of size b/2×b and two vertically adjacent square blocks, each of size b/2×b/2. A partition type may splits a b×b block into four vertically adjacent rectangular blocks, each of size b×b/4. A partition type may split a b×b block into four horizontally adjacent rectangular blocks, each of size b/4×b. This adds up to another six partition types, which may be referred to as extended partition types.

The number of decisions rapidly increases where additional partition types are added. In an example where a codec uses a largest coding unit size of 128×128 pixels, the four basic partition types, and the six extended partition types (for a total of 10 partition types), there are 85 decisions (corresponding to one 128×128 partition decision, four 64×64 partition decisions, sixteen 32×32 partition decisions, and sixty-four 16×16 partition decisions) per partition type for quadtree partitions only. In a case where model is used to also determine non-quadtree partitions, then there can be 850 decisions (corresponding to 85 decisions multiplied by ten partition types).

FIG. 11 also aids in the understanding of the development of formula (5), and hence of Loss(RDC). More particularly, and as shown by the shaded blocks of FIG. 11, the partition decision can involve recursive partitioning, where a split partition mode requires consideration of the available partitions for each resulting block. More broadly, in order to determine whether the partition or non-partition of a block b×b is better, the rate and distortion resulting from not partitioning the block may be compared to the rate and distortion totals resulting from subsequent partition decisions. In FIG. 11 and formula (5), only the split partition mode can result in further partition decisions. In other implementations, however, further partition decisions for other partition modes are possible.

Figure 12:
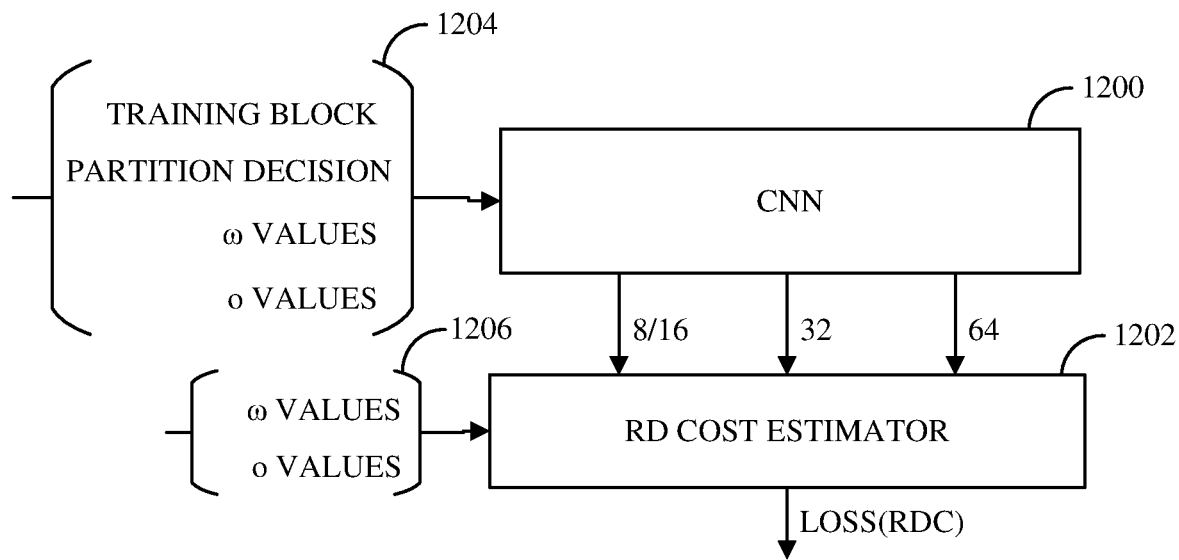
FIG. 12 is a diagram that illustrates training of a machine-learning/deep-learning model

In order to incorporate these techniques into a machine-learning/deep-learning model, the structure of FIG. 12 may be used. In FIG. 12, the model 1200 may be a CNN having a structure as described in regards to the example of FIG. 9. The model 1200 is trained, using training data 1204, to infer a mode decision for an image block. The image block can be a block of an image (e.g., a video frame) that is to be encoded using inter- or intra-prediction. In this example, the mode decision is a partition decision for the image block. The partition decision may be a quad-tree partition decision of the image block. In another example, the partition decision can be a partition that includes partitions described with respect to FIG. 11.

For training the model 1200, a RD cost estimator 1202 is attached to the model 1200, but without any learnable parameters. This combination of the model 1200 and the RD cost estimator 1202 may be referred to herein as a machine-learning module for ease of explanation. The model 1200 can be trained using the training data 1204 for a plurality of video blocks (also called training blocks) as inputs to the training of the machine-learning module. The plurality of training blocks were encoded by traditional encoding methods such as described with respect to FIGS. 4 and 6-8, using an encoder. Herein, the encoder performing the exhaustive search and the encoder using the model 1200 may be referred to as either the first encoder or the second encoder, solely to distinguish one from the other, without regard to the sequence of use of the encoders. The training data 1204 can include, for a training block of the plurality of training blocks, the partition decisions determined by an encoder implementing the traditional encoding methods, for example, all partitions of all partition modes used in the exhaustive search of the encoder. The training data can include, for a training block of the plurality of training blocks, a rate-distortion value resulting from encoding the training block using the partition decision. For each partition decision, the rate-distortion value resulting from encoding the training block using the partition decision may comprise a rate-distortion cost for encoding the training block without further partitioning the training block and a cost incurred when splitting the training block. For example, the rate-distortion value can be values for ω and o corresponding to $RDC_b$ and $\Delta_b$ (and accordingly $RDC_{MIN}$) for respective partition decisions. Many indications (e.g., representations) of the partition decision are possible. In an example, a vector (e.g., sequence) of binary flags, as described with respect to the quadtree 704, can be used, with respective values for ω and o for each partition decision.

A subset 1206 of the training data 1204 is input into the RD cost estimator 1202 in order to estimate the RD cost of the partition output from the model 1200. The rate-distortion cost estimator can receive a predicted partition from the machine-learning model, optionally along with the rate-distortion values (e.g., values for ω and o corresponding to $RDC_b$ and $\Delta_b$) for respective partition decisions, and estimate a predicted rate-distortion value for the loss function. For example, in the training phase, parameters of the model 1200 are generated such that the model 1200 infers, for a training block, at least some of the partition/non-partition decisions (predicted partitions $p_b$), such as the quad-tree partitioning decisions described in regards to FIG. 7, and the predicted partitions are used to calculate Loss(RDC) according to formula (7). The predicted partitions $p_b$ are represented in FIG. 12 by arrows labeled 64, 32, and 8/16, which in this example represents the quad-tree decisions for blocks with dimensions 64×64, 32×32, and 16×16, respectively. The predicted partitions $p_b$, together with the labeled partitions $y_b$ of the partition decision of the training data 1204 may be used to determine Loss(partition) according to, for example, formula (1) or formula (2). The values Loss (partition) and Loss(RDC) may be used in combination to minimize the value Loss in the training of the model 1200.

It is worth noting that this technique for training the model 1200 estimates the partition decision using pre-computed values for ω and o extracted from an exhaustive analysis of the encoder and then uses that to estimate the cost of the partitions. An alternative technique is to estimate values for ω and o directly as part of the training of the model 1200. Then, the RD cost could be incorporated directly into the model 1200 to produce the partitions instead of using the separate RD cost estimator 1202. However, this latter technique is less desirable because estimating ω and o is significantly more difficult.

During training, the model 1200 learns (e.g., trains, builds, derives, etc.) a mapping (i.e., a function) that accepts, as input, a block and outputs a partitioning of the block. During training, and so that the learned function can be as useful as possible, it is preferable that the model 1200 be trained using a large number of input training blocks that respectively result in different partition decisions such that each partition decision is associated with multiple input training blocks.

Figure 13:
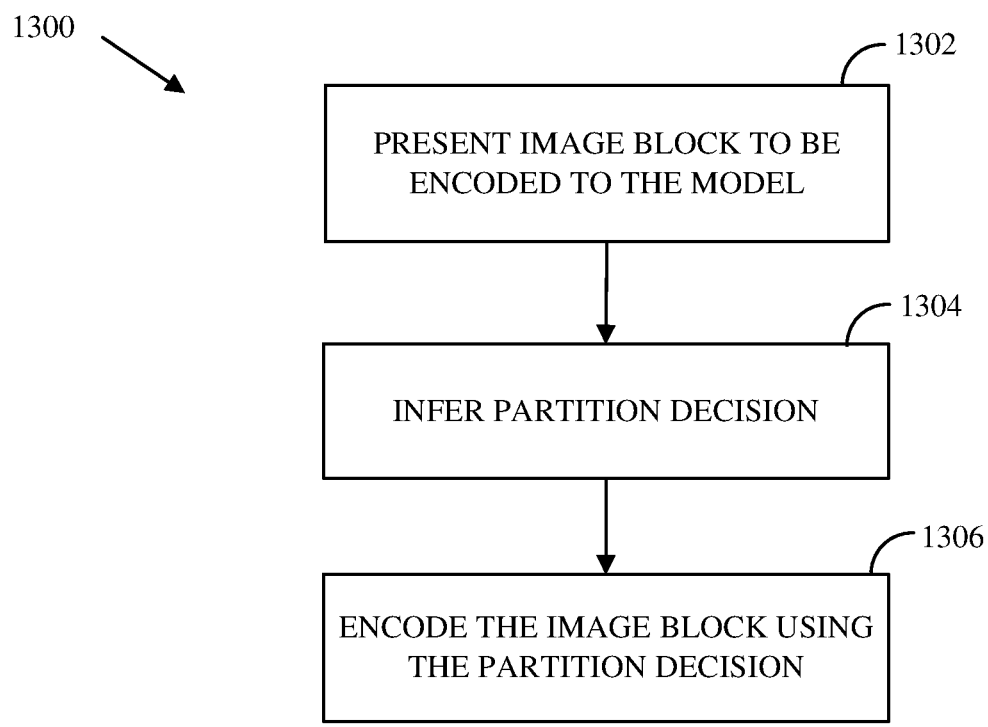
FIG. 13 is a flowchart of a process for encoding using inferences obtained from the machine-learning/deep-learning model trained according to FIG. 12.

FIG. 13 is a flowchart of a process 1300 for encoding using inferences obtained from the machine-learning/deep-learning model 1200 trained according to FIG. 12. The model 1200 can be used in an inference phase while encoding a current block. That is, the RD cost estimator 1202 is removed from its attachment to the model 1200 during inference, as a main goal of this network is to obtain a partitioning for image blocks.

At 1302, an input is presented to the model 1200. The input is an image block to be encoded. The image block can be a one color-plane block. As such, the block can be a luminance block. The block can be the largest CU for the encoder. While a block of size 64×64 is described in the development of the formulas above, the block can be of any size. For example, the block can be 128×128 pixels, 32×32 pixels, or any size block for which a partition is typically determined by an encoder. As mentioned above, the encoder can be any block-based encoder.

At 1304, the model 1200 infers or obtains a partition decision for the block. For example, model 1200 may provide an output (referred to as a partition decision) that is indicative of a (e.g., quad-tree) partitioning of the block. The partition decision may comprise one or more decisions of whether or not to split the block into different partitions until a smallest partition size is reached such as described with regard to FIG. 7 or FIG. 11. The partition decision may comprise a single decision—namely that the block should not be split. The partition decision may comprise a combination of splitting and non-splitting decisions for the block. The model 1200 can be used by an encoder where the smallest possible block partition is an 8×8 partition. As such, decisions or determinations of whether to split a block are made by the model 1200 for blocks (i.e., sub-blocks of the largest CU) that are 16×16 or larger in this example. The model 1200 can be used by an encoder where the smallest possible block partition is a 4×4 partition. As such, decisions or determinations of whether to split a block are made by the model 1200 for blocks (i.e., sub-blocks of the largest CU) that are 8×8 or larger in this example.

At 1306, the image block is encoded using the partition decision. The model 1200 provides input to an encoder, such as the encoder 400, or can be incorporated into the encoder. For example, the partition decision defines a respective block size for one or more blocks (e.g., sub-blocks) that are predicted at the intra/inter-prediction stage 402 of FIG. 4. The block size(s) may be provided to the intra/inter-prediction stage 402, or the model 1200 may be incorporated into the intra/inter-prediction stage 402. The remainder of the encoding steps for each block may proceed in accordance with the description of FIG. 4, ultimately finishing with entropy encoding, as described with respect to the entropy encoding stage 408, each block, and hence the image block as a whole, in a compressed bitstream, such as the bitstream 420 of FIG. 4. The partition decision may also be encoded into the compressed bitstream.

A decoder, such as the decoder 500 of FIG. 5, can decode the image block using the partition decision received in the compressed bitstream. That is, a process of decoding an image block can include receiving, in a compressed bitstream, such as the compressed bitstream 420 of FIG. 5, an indication of a partitioning of the image block into one or more sub-blocks; and decoding the image block using the indication of the partitioning by decoding the one or more sub-blocks.

For simplicity of explanation, the processes herein are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus, comprising:
a processor that is configured to:
  receive training data comprising:
    a plurality of training blocks; and
    for a training block of the plurality of training blocks:
      a plurality of partition decisions used by an encoder for encoding the training block; and
      for each partition decision of the plurality of partition decisions,
      a rate-distortion value resulting from encoding the training block using the partition decision; and
    train a machine-learning model to output a partition decision for encoding an image block by:
      inputting the training data into a neural network using a loss function comprising a combination of:
        a partition loss function that is based upon a relationship between the partition decisions and respective predicted partitions; and
        a rate-distortion cost loss function that is based upon a relationship between the rate-distortion values and respective predicted rate-distortion values.

2. The apparatus of claim 1, wherein the neural network comprises a convolution neural network, and the processor is configured to train the machine-learning model by:
determining the respective predicted rate-distortion values using a rate-distortion cost estimator coupled to the convolution neural network.

3. The apparatus of claim 1, wherein the rate-distortion cost loss function exponentially penalizes a predicted partition that does not match a selected partition decision for the training block that results from an exhaustive partition search of the encoder.

4. The apparatus of claim 1, wherein the machine-learning model is trained using the loss function by applying a greater weight to the partition loss function than to the rate-distortion cost loss function.

5. The apparatus of claim 1, further comprising:
a second encoder including the machine-learning model, the machine-learning model receiving an image block and determining a partition decision for the image block, and the second encoder encoding the image block using the partition decision.

6. A method, comprising:
presenting, to a machine-learning model of a first encoder, an image block, wherein the machine-learning model was trained to output a partition decision for encoding the image block with:
  training data for a plurality of training blocks, the training data including, for a training block of the plurality of training blocks;
    a plurality of partition decisions used by a second encoder for encoding the training block; and
    for each partition decision of the plurality of partition decisions, a rate-distortion value resulting from encoding the training block using the partition decision; and
  a loss function comprising a combination of:
    a partition loss function based upon a relationship between the partition decisions and respective predicted partitions; and
    a rate-distortion cost loss function based upon a relationship between the rate-distortion values and respective predicted rate-distortion values;
obtaining the partition decision for encoding the image block from the machine-learning model; and
encoding, in a compressed bitstream, the image block using the partition decision.

7. The method of claim 6, wherein the loss function combines the partition loss function and the rate-distortion cost loss function using different multipliers for the partition loss function and the rate-distortion cost loss function.

8. The method of claim 6 or 7, wherein the partition loss function comprises a binary cross entropy function that applies respective weights to the partition decisions, a weight applied to a partition decision of the plurality of partition decisions equal to the rate-distortion value of the partition decision normalized by a lowest rate-distortion value resulting from the plurality of partition decisions.

9. The method of claim 6, wherein a rate-distortion cost estimator receives a predicted partition from the machine-learning model and estimates a predicted rate-distortion value for the loss function, and the machine-learning model is a convolutional neural network model.

10. The method of claim 6, wherein for each partition decision of the plurality of partition decisions, the rate-distortion value resulting from encoding the training block using the partition decision comprises a rate-distortion cost for encoding the training block without further partitioning the training block and a cost incurred when splitting the training block.

11. The method of claim 6, wherein the plurality of partition decisions comprises at least one of quad-tree partition decisions or partition decisions resulting in at least one non-square partition of the training block.

12. An apparatus, comprising:
a processor that:
  presents, to a machine-learning model, an image block, wherein the machine-learning model was trained to output a partition decision for encoding the image block with:
    training data for a plurality of training blocks, the training data including, for a training block of the plurality of training blocks:
      a plurality of partition decisions used by an encoder for encoding the training block; and for each partition decision of the plurality of partition decisions, a rate-distortion value resulting from encoding the training block using the partition decision; and a loss function comprising a combination of:
a partition loss function based upon a relationship between the partition decisions and respective predicted partitions; and
a rate-distortion cost loss function based upon a relationship between the rate-distortion values and respective predicted rate-distortion values;

obtains the partition decision for encoding the image block from the machine-learning model; and encodes, in a compressed bitstream, the image block using the partition decision.

13. The apparatus of claim 12, wherein the rate-distortion cost loss function is, for each partition decision of the plurality of partition decisions, an exponential function comprising a difference between the rate-distortion value resulting from encoding the training block using the partition decision and a predicted rate-distortion value.

14. The apparatus of claim 12, wherein, for each partition decision of the plurality of partition decisions, a respective predicted rate-distortion value is normalized using a lowest rate-distortion value of the plurality of partition decisions within the rate-distortion cost loss function.

15. The apparatus of claim 12, wherein the rate-distortion cost loss function comprises:
a determination of the predicted rate-distortion value using the partition decision of the plurality of partition decisions and the rate-distortion value resulting from encoding the training block using the partition decision of the plurality of partition decisions, wherein the partition decision comprises a combination of splitting and non-splitting decisions of the training block, and the rate-distortion value comprises a combination of rate-distortion values resulting from encoding the training block using the combination of splitting and non-splitting decisions.

16. The apparatus of claim 15, wherein a predicted rate-distortion value comprises a first term representing a rate-distortion cost of a non-splitting decision for the training block and a second term representing a rate-distortion cost of a splitting decision for the training block that splits the training block into a plurality of sub-blocks.

17. The apparatus of claim 16, wherein:
the rate-distortion cost of the splitting decision for the training block that splits the training block into the plurality of sub-blocks comprises a respective rate-distortion cost for partition decisions of each of the plurality of sub-blocks;
the rate-distortion cost of the first term is weighted by a lowest rate-distortion value of the plurality of partition decisions used for encoding the training block; and
the rate-distortion cost of the second term comprises weighting each of the respective rate-distortion costs for partitioning each of the plurality of sub-blocks by the lowest rate-distortion value of the plurality of partition decisions used for encoding the training block.

18. The apparatus of claim 12, wherein the machine-learning model was trained using a rate-distortion cost estimator, the rate-distortion cost estimator receiving a predicted partition from the machine-learning model and estimating a predicted rate-distortion value for the loss function.

19. An apparatus, comprising:
a machine-learning model;
an encoder that generates training data by encoding each training block of a plurality of training blocks multiple times, each time encoding a respective training block using a respective partition decision of a plurality of partition decisions; and
a processor configured to train the machine-learning model to output a partition decision for encoding an image block by:
receiving the training data, the training data including, for a training block of the plurality of training blocks:
the partition decisions used by the encoder for encoding the training block; and
for each partition decision of the partition decisions, a rate-distortion value resulting from encoding the training block using the partition decision, a loss function for training of the machine-learning model comprising a combination of:
a partition loss function that is based upon a relationship between the partition decisions and respective predicted partitions; and
a rate-distortion cost loss function that is based upon a relationship between the rate-distortion values and respective predicted rate-distortion values.

20. The apparatus of claim 19, further comprising:
a rate-distortion cost estimator that receives a predicted partition from the machine-learning model and estimates a predicted rate-distortion value for the loss function.

* * * * *